United States Patent
Konopa

(10) Patent No.: US 6,690,512 B2
(45) Date of Patent: Feb. 10, 2004

(54) ADJUSTABLE, ERGONOMIC MICROSCOPE BASE

(75) Inventor: Raymond S. Konopa, Alden, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/866,255

(22) Filed: May 25, 2001

(65) Prior Publication Data

US 2002/0176159 A1 Nov. 28, 2002

(51) Int. Cl.[7] .......................... G02B 21/26; G02B 21/00
(52) U.S. Cl. ...................... 359/391; 359/368; 359/394
(58) Field of Search .................... 359/368, 391–398, 359/382–384

(56) References Cited

U.S. PATENT DOCUMENTS

| 328,277 A | 10/1885 | Bausch | 359/368 |
|---|---|---|---|
| 536,552 A | 3/1895 | Swift | 359/391 |
| 2,604,815 A | 7/1952 | Englemann | 359/391 |
| 2,730,923 A | 1/1956 | Gorham et al. | 359/391 |
| 4,405,202 A | 9/1983 | Kimball | 359/368 |
| 4,509,834 A | 4/1985 | Hodgson | 359/368 |
| 4,639,097 A | 1/1987 | Teske et al. | 359/813 |
| 4,912,388 A | * 3/1990 | Tanaka et al. | 318/640 |
| 5,052,788 A | 10/1991 | Tachibana | 359/391 |
| 5,517,354 A | 5/1996 | Mika | 359/394 |

OTHER PUBLICATIONS

Publication: Micromanipulators, Hacker Instruments, Inc. Jan. 1972.

* cited by examiner

Primary Examiner—Thong Q. Nguyen
(74) Attorney, Agent, or Firm—Michael F. Scalise

(57) ABSTRACT

An ergonomic adjustable microscope device comprising a second base pivotably attached to a first base positioned on a support surface is described. The device includes a mechanism for locking a microscope in a nonmovably mounted relationship on the upper surface of the second support base. Manually rotatable adjusting mechanisms located at each rearward corner of the second support base and at all four corners of the first base provide for selectively varying the rearward vertical height of the second support base and mounted microscope and the vertical height of the first base relative to the support surface, respectively, so that a user of the microscope is able to maintain a more neutral position in the neck, back, and shoulder areas.

11 Claims, 4 Drawing Sheets

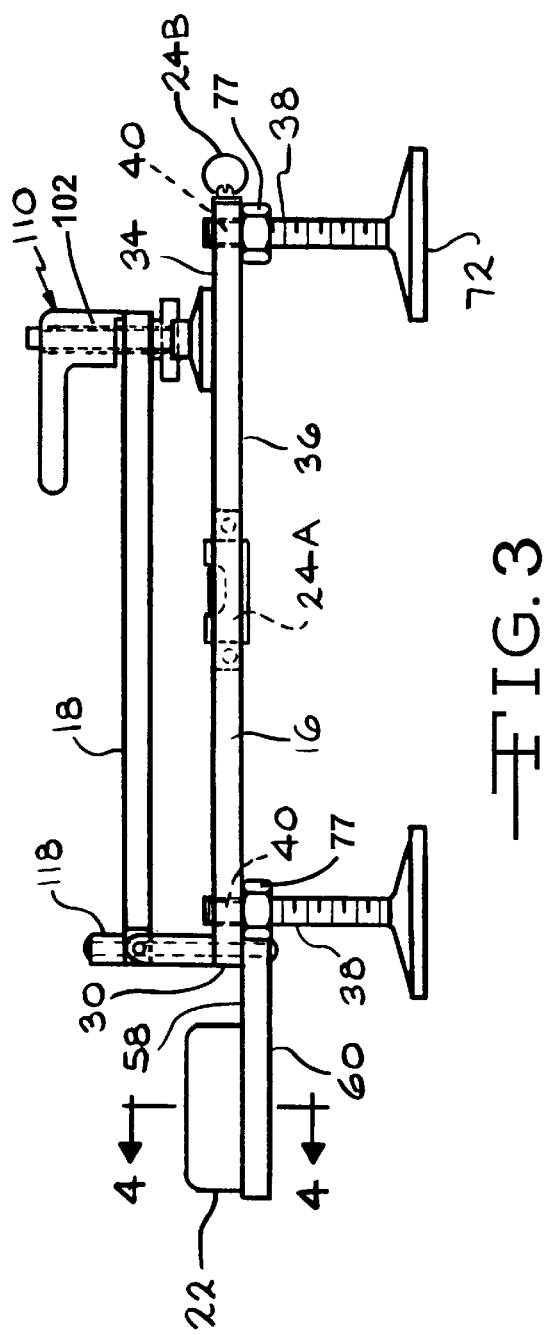
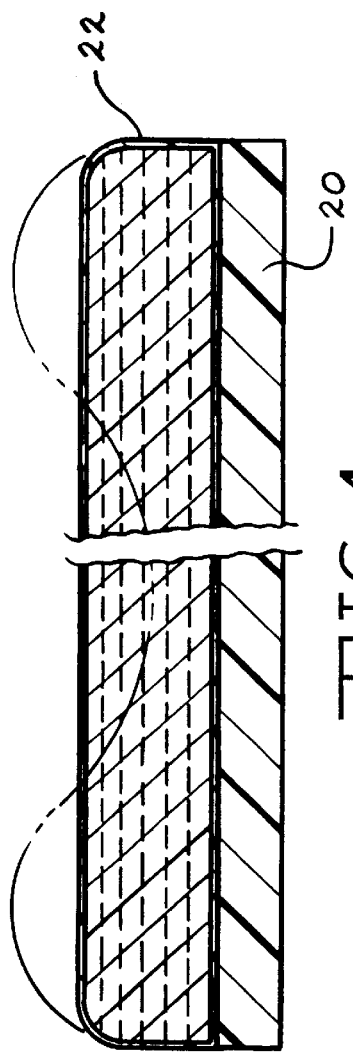
FIG. 3
FIG. 4

ADJUSTABLE, ERGONOMIC MICROSCOPE BASE

BACKGROUND OF THE INVENTION

1. Field of the Invention

The present invention relates to microscopes, and scope accessories. More particularly, the present invention relates to an ergonomic support device comprising an adjustable base attachable to the base of a microscope.

Standard microscopes require that the operator lean forward in a static position to look into the instrument, and maintain that position when operating the instrument for extended periods of time. A number of conditions may be encountered while operating a microscope including repetitive motion, awkward posture, and stress, which are contributing factors to cumulative trauma disorders. Cumulative trauma disorders (CTDs) include several syndromes characterized by eye strain, backaches, neck pain, headaches, and repetitive-strain injuries such as carpal tunnel syndrome. CTDs are estimated to account for more than 50 percent of all workplace illnesses, with a significant number of reported cases in the U.S. workforce.

An ergonomic support device for a microscope which would adapt the instrument to human capabilities and limitations associated with its operation, is desirable. In that respect, the present invention is directed to an adjustable microscope base which is attachable to a microscope. The base comprises a first base having leveling adjusters pivotally attached to a second base, which has dual adjusters located at the rear of the second base which can be used to raise or lower the pitch or tilt angle of an attached microscope so that the operator can maintain a more neutral position in the neck, back, and shoulder areas. Thus, the present invention reduces the level of discomfort and risk of CTDs previously encountered due to the constant load on the neck, back and shoulders created by the forward lean in the operation of a microscope.

2. Prior Art

Devices used to provide a tilting arrangement for optical instruments have been described previously in the art. One such device is described in U.S. Pat. No. 2,604,815 to Engelmann, and comprises a table adapted to detachably receive the instrument and is provided with at least three legs. The rear leg, when laid down, provides a tilting arrangement to the attached microscope. However, neither the pitch nor the elevation of the instrument is adjustable; thus, the operator is limited to only a single angle of inclination.

U.S. Pat. No. 2,730,923 to Gorham et al. discloses a unitary microscope-support and lamp allowing the use of the microscope in an upright position, or in a forwardly tilted position. In either case, the optical axis of the microscope lamp is maintained in correct relation to the optical axis of the microscope. The unitary microscope support and lamp is a rather bulky device which is limited in the adjustability of the pitch of the attached instrument.

U.S. Pat. No. 5,052,788 to Tachibana discloses a microscope that also has a telescope function. The microscope has a base, an arm which is rotatably attached to the base, and a microscope barrel to which can be attached a telescope tube. To utilize the telescope function, the arm is rotated in a rearward direction, away from the position of the operator.

U.S. Pat. No. 5,517,354 to Mika describes a microscope supported on a base. The base is provided with adjusters located at the rear corners to selectively vary the rearward height of the base. This invention does not provide for elevational adjustment of a secondary base supporting the microscope base, as in the current invention.

SUMMARY OF THE INVENTION

An ergonomic adjustable microscope base comprising a first and second base positioned on a support surface; having means to prevent the base from sliding on the support surface; having means to adjust the vertical elevation of the microscope base having means mechanisms for attaching and locking a microscope in a nonmovably mounted relationship with the upper surface of the second support base; and manually rotatable adjusting mechanisms, located at each rearward corner of the base and operatively associated with the base, to provide for selectively varying the overall and secondarily, the rearward vertical height of the base and mounted microscope relative to the support surface, thereby providing a range of vertical heights and of forward title angles so that a user of the microscope is able to maintain a more neutral position in the neck, back, and shoulder areas.

Therefore, there is a need for an adjustable microscope base, connectable to the bottom of a microscope, which comprises a support base further having adjusters used to raise or lower both the vertical elevation and the forwardly inclined pitch of the entire subassembly (the base and the microscope) to various degrees so as to provide operating conditions that are individually suitable for an operator to maintain a more neutral position in the neck, back, and shoulder areas.

The foregoing and additional advantages and characterizing features of the present invention will become apparent upon reading the ensuing description together with the included drawings.

BRIEF DESCRIPTION OF THE DRAWINGS

FIG. 3 is a side elevational view of the adjustable microscope base without a microscope.

FIG. 4 is a cross-sectional view along line 4—4 of FIG. 3.

BEST MODE TO CARRY OUT THE INVENTION

In describing the invention and in referring to the figures, the terms "rearward" and "forward" simply refer to the orientation of the adjustable base, and the microscope adjustably attached thereto (the combination being termed the "assembly"), relative to the position of the operator of the assembly. Thus, "rearward" refers to a direction furthest from an operator using the assembly; whereas, "forward" refers to a direction toward the operator.

Figure 1:
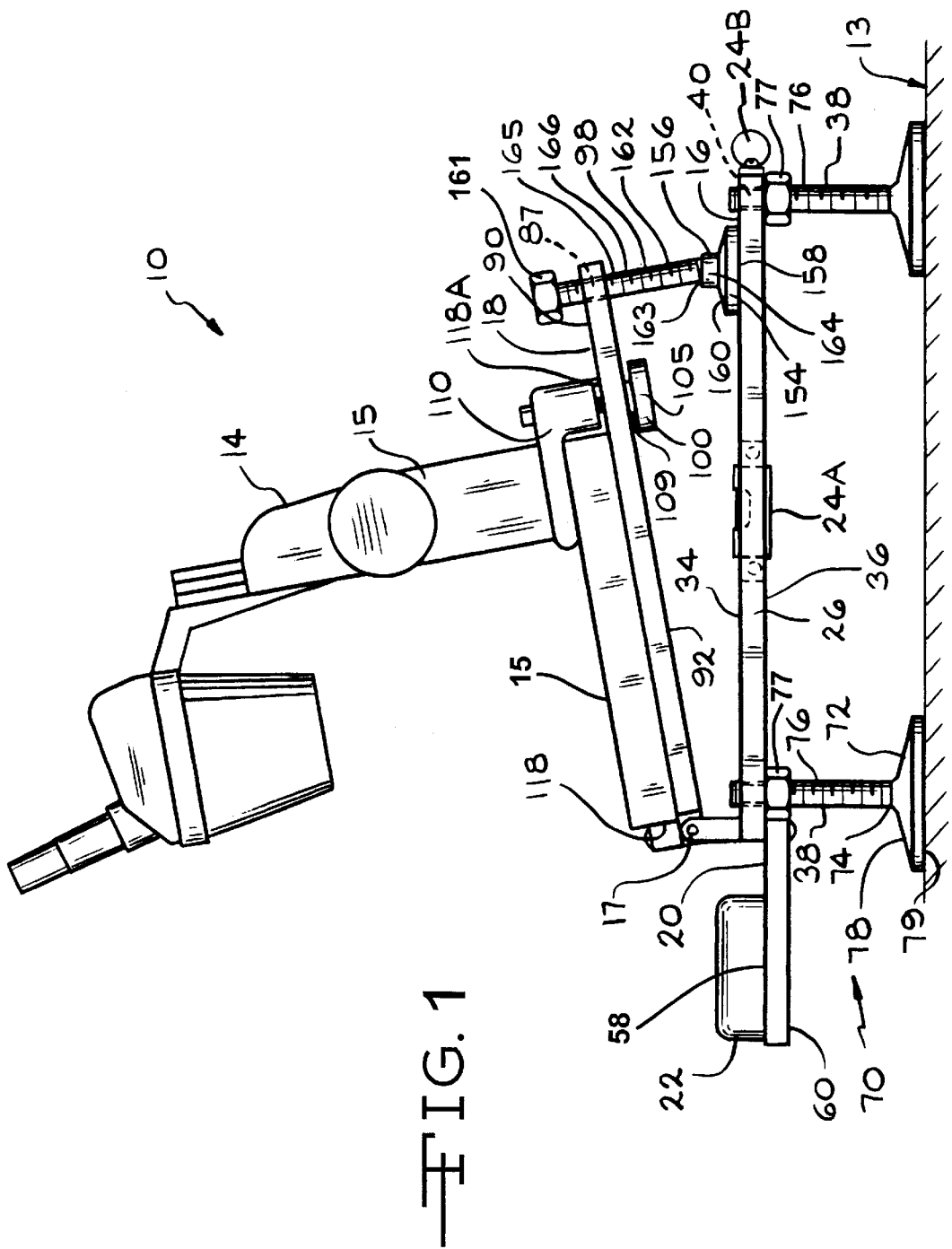
FIG. 1 is a side elevation view of an adjustable microscope support device 10 according to the present invention with a microscope 14 mounted thereon.
Figure 2:
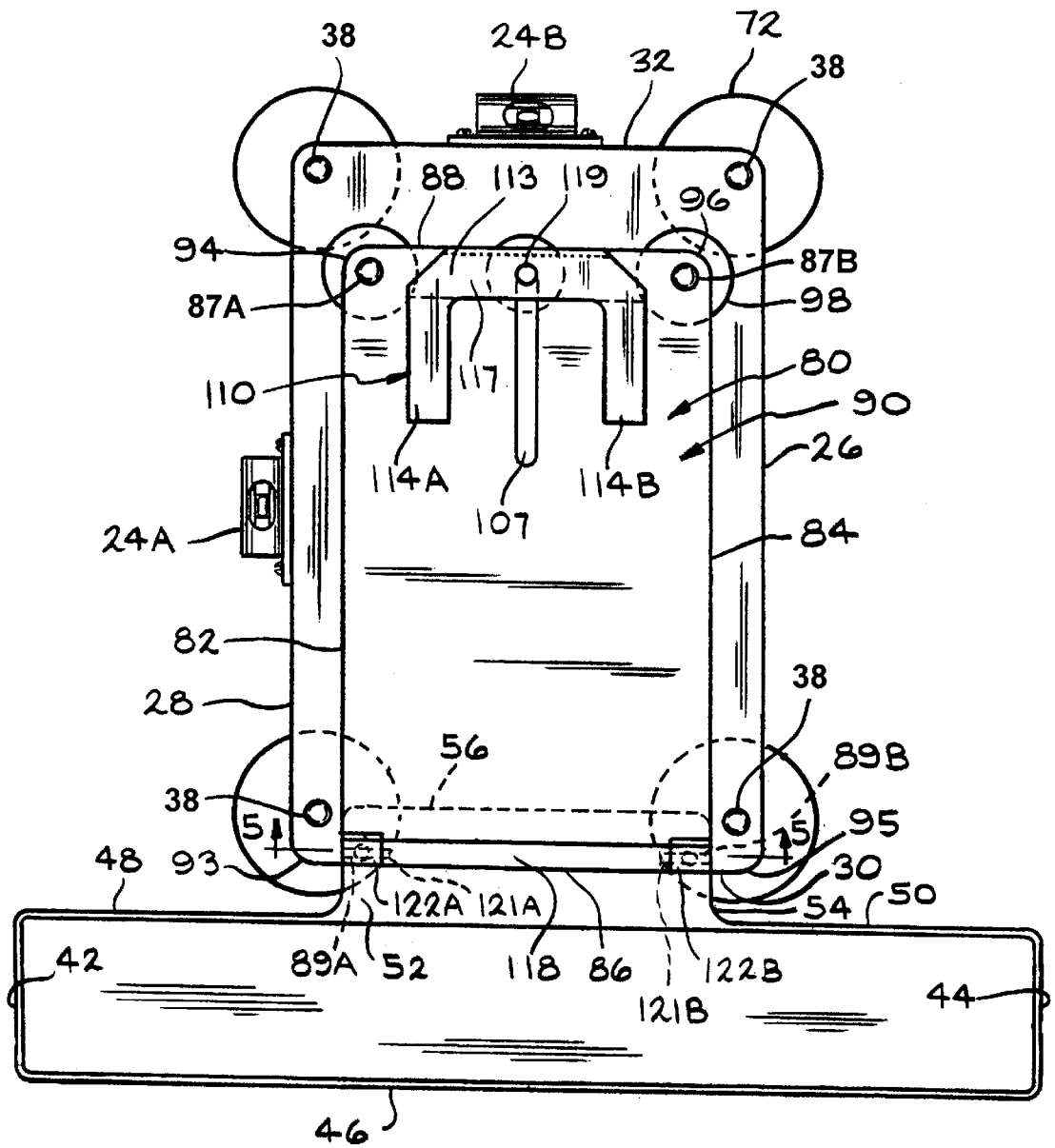
FIG. 2 is a plan view of the adjustable microscope base 10 without a microscope.

Referring now to the drawings, FIGS. 1 to 3 show one embodiment of the adjustable microscope support device 10 of the present invention. Microscope support device 10 can be made of a suitable metal materials that are cut to size and formed to the proper shapes, or device 10 can be made of a plastic material that has been injection molded to shape, or any other suitable fabricated material. A preferred material is DELRIN™, a plastic material.

The microscope support device 10 generally consists of a first base 16 pivotally attached to a second base 18. The first base 16 is preferably integral and consists of spaced apart side walls 26 and 28 extending to and meeting with a front wall 30 at rounded corners and side walls 26 and 28 further extending to and meeting with a rear wall 32 at rounded corners. Walls 26, 28, 30, and 32 extend up and meet with upper surface 34 and walls 26, 28, 30, and 32 further extend down and meet with lower surface 36.

Inwardly spaced at the corners of the first base 16 formed from the intersections of side walls 26 and 28 meeting rear wall 32 and front wall 30 are four threaded apertures 40 suitably sized for threaded engagement with vertical adjustment means 38 located at the corners of the first base. The adjustment means 38 will be discussed in detail in a later section.

A forward extension plate 20 is attached to the lower surface 36 of the first base 16. The extension plate 20 is a generally T-shaped member consisting of spaced apart side walls 42 and 44 extending to and meeting perpendicularly with front wall 46. Side walls 42 and 44 each further extending to and meeting perpendicularly with side walls 48 and 50, respectively. Side walls 48 and 50 individually further extend to and meet perpendicularly with exterior walls 52 and 54 respectively at rounded corners. Extension walls 52 and 54 further extend to and meet with end extension wall 56 at rounded corners. The walls of the extension 42, 44, 46, 48, 50, 52, 54, 56 extend to and meet with upper surface 58 of the extension and walls 42, 44, 46, 48, 50, 52, 54 and 56 further extend down and meet with lower surface 60. The first base 16 has first and second level indicators 24A and 24B attached to walls 28, 32, respectively.

The extension 20 further includes an ergonomic support 22 located on the upper surface 58 of the extension 20. The support 22 is removably attached to the base extension 20 and is sized to fit within the surface area of the extension. The support may contain a polymeric gel or other suitable material for support of the arms and wrists.

The vertical adjustment and level adjustment means 70 for the first base 16 per FIGS. 1 through 3, can assume a number of varied embodiments. In the embodiment shown in FIG. 1, the means includes a circular base 72 containing a centrally located aperture 74 concentric wit circumference of the base 72, and the base further having a contoured upper surface 78 and flat lower surface 79. The flat lower surface 79 may contain a friction generating surface (not shown) which will prevent slippage on support surface 13. Nested inside the aperture 74 is a threaded rod 76, having thread pitch to match the thread tap in the apertures 40 located in the first base 16. This embodiment of the level adjustment means may contain a locking nut 77 threadingly received on rod 76 of adjustment means 38. The purpose of the locking nut is to secure the elevation of the support base when operating the microscope. As those who are skilled in the art will realize it is not necessary that the adjustment be used for leveling, the means may also be used to adjust the assembly in a vertical plane to assist the operator to maintain a position that will reduce ergonomic injuries. Moreover, it will be realized that other types of mechanical adjusters may be used to adjust the height and level than the embodiment shown. All that is necessary is that the adjuster can be moved in a vertical plane and it is in operative contact with the support surface 13. The first base 16 is attached to the second base 8 by a pivoting member 17, which will be discussed in a later section.

The second base 18 is preferably fabricated as an integral member and is generally a rectangular plate 80 having opposed side walls 82 and 84 that extend to and meet with spaced part front and rear walls 86 and 88 joined to an upper surface 90 and a lower surface 92. As shown in FIG. 2, the rearward corners 94 and 96 formed at the junctions of opposed side walls 82 and 84 with rear wall 88 are rounded. In the vicinity of the front corners 93 and 95 respectively formed by the intersection of front wall 86 with side walls 82 and 84 are two rectangular cutouts 89A and 89B. The cutouts 89A and 89B remove identical generally rectangular sections from the second base 18. The cutouts 89A and 89B are sized to enhance operation of the pivoting means 17. The surface area of each of the cutout areas 89A and 89B is sized lightly larger than cross-sectional area of each extension, 138 and 140 respectively (FIG. 3).

Two threaded apertures 87 are inwardly spaced from rearward corners 94 and 96 (FIG. 2). The apertures 87 are suitably sized for a threaded adjustment means 98 located at each rear corner of the second base. The adjustment means 98, will be discussed in detail later.

Figure 5:
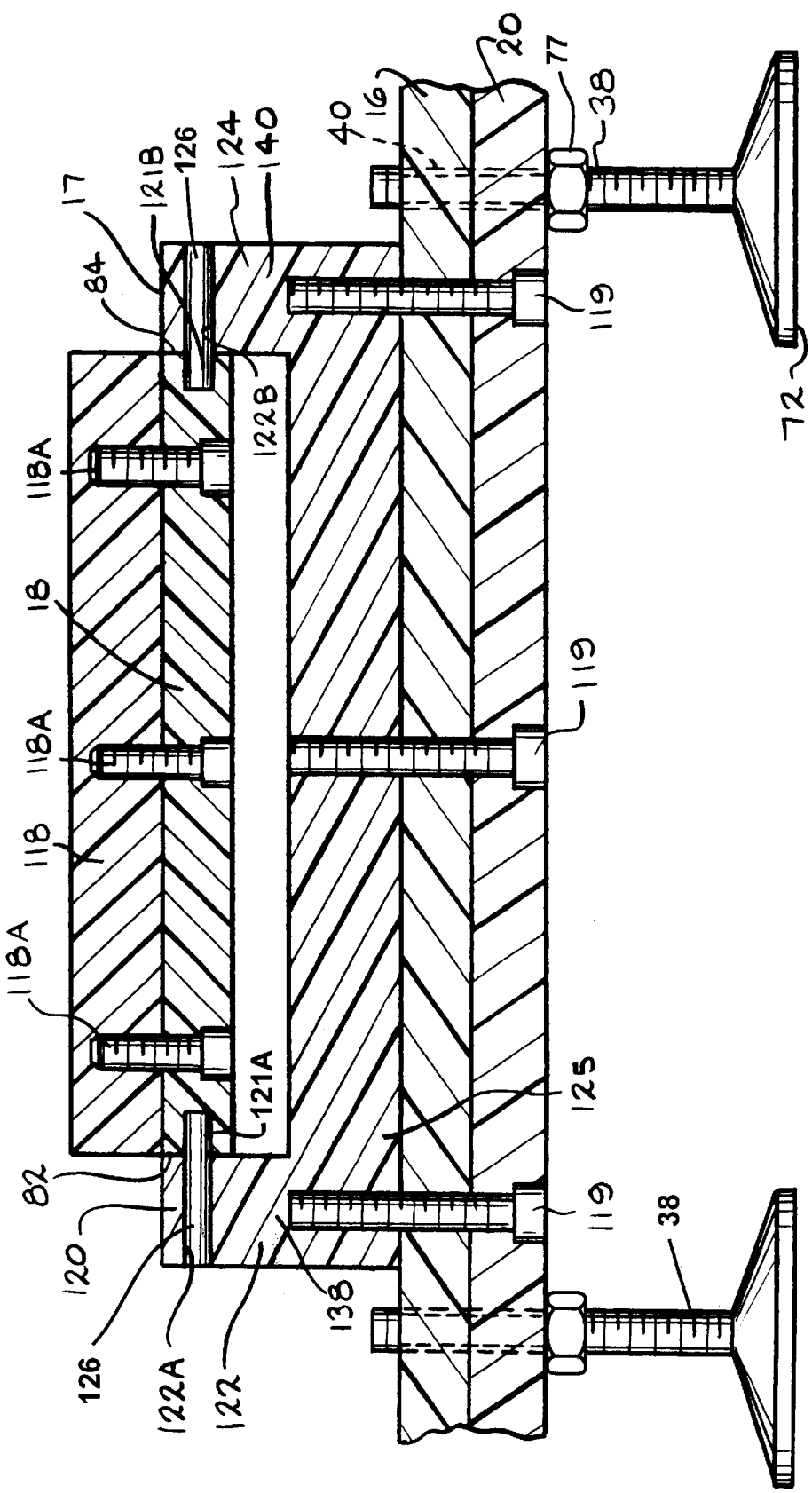
FIG. 5 is a cross-sectional view along line 5—5 of FIG. 2.

The upper surface 90 of the second base 18 contains an upwardly directed extension 118 of the base located adjacent to the front wall 86. The extension 118 is a bar shaped member, used as a stop against which the microscope base 15 abuts as the second base 18 traverses through its forwardly extending motion by manipulation of the rear adjustment 98. The extension 118 may be integral with base 18, or it may be attached thereto by screws 118A, as shown per FIG. 5

Now, the pivoting means 17 will be described according to the embodiment which is depicted in FIGS. 1 through 3 and 5. The pivoting means 17 comprises a generally U-shaped member 120 having a first leg 122 and a second leg 124 connected by an intermediate bar 125. The legs 122, 124 are provided with respective through bores 122A and 122B which, in turn, house cylindrical pins 126. The pins 126 are compressibly secured in respective apertures 121A and 121B located in side walls 82 and 84 of the second base 18.

The pins 122 provide for pivotable motion of the U-shaped member 120 secured to the first base 16 with respect to the second base 18. The intermediate bar 125 is removably secured to the first base 16 which, in turn, is secured to the base extension 20 by attachment means 119. While the preferred method of attachment is using threaded bolts 119, other methods may be used.

A microscope 14 is positioned on the upper surface 90 of the second base 18 and is releasably attached thereto to form an assembly. Provided adjacent to the rearward corners 94 and 96 of the base 18 (FIG. 2) are a pair of dual adjusting means 98 which are used to raise and lower the forwardly inclined pitch of the entire assembly relative to the first base 16, as will be explained in detail presently. This construction provides a range of forward tilt angles to the entire assembly so as to provide the microscope 14 at a comfortable position for a user. The first base 16 is supported on a support surface 13 (FIG. 1), which may be a laboratory benchtop, tabletop, desktop, or other like surface upon which microscope 14 operatively associated with the microscope support device 10.

As shown n FIGS. 1 to 3, a retaining clamp 110 is used for releasably attaching and locking the base 15 of the microscope 14 (FIG. 1) in a non-movably mounted relationship with respect to second base 18, such that microscope base 15 is firmly and operatively in contact with upper surface 90 of second base 18. In one exemplary but non-specifically limiting form, the clamp 110 comprises a generally rectangular flat bar 113 with perpendicular leg extensions 114A and 114B protruding from the ends of he bar. The clamp 110 further comprises a bolt 100 (FIG. 1) having its circular head 105 containing a raised abraded surface on the circumference of he head. The head of bolt 100 is positioned proximate the lower surface 92 of adjustable base 18 (FIG. 1), with threaded shaft 102 (FIG. 3) extending upwardly through a slot 107 (FIG. 2) provided in base 18 centered between walls 82, 84, and having its longitudinal axis parallel therewith. The bolt 100 threads into an aperture 119 in the flat bar 113 of the clamp 110 whose position is adjustable along the length of the slot. This provides for securing microscopes of different sizes to the second base 18, depending on the size of the microscope base 15. A lock washer 109 can be mounted on the threaded shaft of the bolt, between the circular head 105 of bolt 100 and the lower surface 92 of second base 18, so that when the clamp 110 is tightly secured to the second base 15, the microscope 14 is firmly locked and snugly captured between the upper surface 90 of second base 18 and the clamp 110.

It can also be further contemplated by the scope of the present invention that the second base 18 may be A formed as an integral member with microscope 14. In that respect and if, for example, microscope base 15 is made of a plastic or metal material formed in a casting process, base 18 and microscope base 15 can be formed integrally, as is obvious to those of ordinary skill in the art.

The second adjustable base 18 is provided with the dual adjusting means 98 positioned adjacent to each of the rearward corners 94 and 96. The adjustment portion of the means provide for raising and lowering the second base 18 and microscope 14 assembly through an infinite number of vertical heights to thereby regulate the assembly through a range of forward tilt angles relative to the first base 16, so as to provide the microscope 14 at a comfortable position for the user. The adjusting means 98 are identical and will therefore be described with respect to one of the pair for the sake of simplicity.

As shown in FIGS. 1 through 3, the adjusting means 98 each include a circular base 154 containing a centrally located round socket 156 concentric with the circumference of the base, and the base further containing a flat lower surface 158 and a contoured upper surface 160. Nested inside of the socket 156 is a threaded rod 162 having upper and lower ends. A round metal ball (not shown) attached to the lower end 163 is suitably sized to be rotatably secured inside socket 156; the upper end 165 has threads 166 suitably sized to fit within the apertures 87A and 87B located in support base 18.

A jam nut 161 is threadingly received on threaded shaft 162 of adjusting means 98 at a position intermediate of base 154 and the lower surface 92 of the second support 18. Jam nut serves to lock the threaded engagement between shaft 162 and the second base 18 to thereby lock the height adjustment for the rearward position of the second base 18 at a desired tilt angle, as will be explained in further detail presently.

In continuing the example illustrated with respect to one of the two identical dual adjusting means 98 and to adjust the vertical height of the rearward portion of the second base 18 and thus the forward tilt angle of the entire assembly, jam nut of each adjusting means 98 is threaded in a first, preferably counter-clockwise direction, to move jam nut away from contact with the lower surface 92 of base 18. The threaded shafts, generally 162, are then manipulated by firmly gripping the threads 166, which can then be rotated to regulate the rearward vertical height of the second base 18 an microscope 14 assembly through the preferred range of forward tilt angles relative to the first support base 16. In that respect, the threads 166 are each preferably rotated in a clockwise direction to adjust the threaded relationship between shaft 162 and the aperture, generally 87, contained in the second base 18. This serves to lower the height of the rearward portion of the base 18 to thereby decrease the forward tilt angle of the base 18 and microscope assembly 14 relative to the first base 16. Conversely, the threads 166 are preferably rotated in a counter-clockwise direction to cause shaft 162 to extend out through apertures 87A, 87B to cause the distance between first base 16 and lower surface 92 of the second base 18 to increase, thereby raising the height of the rearward portion of second base 18. This serves to increase the forward tilt angle of the entire assembly relative to the first base 16. As previously stated, as each threaded shaft 162 is rotated in either a clockwise or counter-clockwise direction, the shafts 162 serve as an adjusting means or regulating the vertical height of the rearward portion of base 18 to provide a comfortable tilt angle for the assembly. At such time as the assembly has been adjusted to the comfortable tilt angle, the jam nut is rotated in the second, preferably clockwise direction to contact the lower surface 92 of base 18 and thereby lock the threaded engagement of shaft 162 and base 18.

Thus, in this manner, the forward tilt angle, i.e. the slope of adjustable second support base 18 relative to the first base 16, is adjustable through a range from about 0° in a lowermost extent (not shown), to a preferred height of about 15° in an uppermost extent, as shown in FIG. 1. That way, the tilt angle of the attached microscope 14 can be adjusted to provide operating conditions, individually suitable to the user, for maintaining a more neutral position in the neck, back, and shoulder areas.

It should be understood that while the invention has been described in detail herein, the examples were for illustrative purposes only. Other modifications of the embodiments of the present invention that are obvious to those of ordinary skill in the art are intended to be within the scope of the appended claims.

What is claimed is:

1. An ergonomically adjustable support device for supporting a microscope, the support device comprising:

(a) a first base positioned on a support surface and including at least two first adjustment members, each adjustment member comprising a first threaded shaft extending between the first base and the support surface to provide for raising and lowering the vertical height of the first base relative to the support surface;

(b) a second base in operative contact with the microscope; and (c) an attachment member pivotally securing the second base to the first base, wherein the attachment member provides for pivotally adjusting the second base through a range of forward tilt angles to provide the microscope in an individually suitable operating condition.

2. The support device according to claim 1, wherein the second base further includes a second adjustment member comprising at least one second threaded shaft extending between the first base and the second base to provide for raising and lowering the vertical height of a rearward portion of the second base relative to the elevation of the first base through the range of forward tilt angles to provide the microscope at a comfortable position.

3. The support device according to claim 2 wherein the second threaded shaft of the second adjustment member further includes a second threaded locking member for locking the second adjustment member at the comfortable position.

4. The support device according to claim 1 wherein the first threaded shaft of at least one of the first adjustment members further includes a first threaded locking member for locking the first adjustment member at the comfortable position.

5. The support device according to claim 1, wherein the attachment member further includes:

(a) at least one pivot pin; and (b) an intermediate support attached to the first base, wherein the pivot pin provides for pivotable movement of the second base with respect to the intermediate support.

6. The support device according to claim 1, wherein the first base further includes an extension as an ergonomic support.

7. The support device, according to claim 1, wherein the second base further includes a releasable fastener for securing the microscope to an upper surface of the second base.

8. The support device according to claim 7 wherein the releasable fastener comprises:

(a) an upwardly projecting extension of the second base; and (b) a retaining clamp, wherein a first portion of the microscope contacts the extension and a second portion of the microscope is secured to the second base by the clamp.

9. A method for adjusting the vertical height of a microscope as well as its forward tilt angle relative to a support surface, the method comprising the steps of:

(a) providing a support device having first and second bases, the first base pivotally attached to the second base supporting the microscope on an upper surface thereof;

(b) providing at least two first adjustment members threadingly connected to the first base and providing for raising and lowering the vertical height of the first base relative to the support surface;

(c) providing at least one second adjustment member threadingly secured to the second base and providing for raising and lowering the vertical height of a rearward portion of the second base relative to the elevation of the first base through the range of forward tilt angles;

(d) rotating the first adjustment members and causing the first shaft to retract or extend relative to the first base, thereby varying the vertical height of the first base relative to the support surface; and (e) rotating the second adjustment member and causing the second shaft to retract or extend relative to the second support and thereby varying the range of forward tilt angles of the second base and the supported microscope relative to the first base to thereby provide the microscope at a comfortable position.

10. An ergonomically adjustable support device for supporting a microscope, the support device comprising:

(a) a first base positioned on a support surface and including at least two adjustment members, each for raising and lowering the vertical height of the first base relative to the support surface;

(b) a second base in operative contact with the microscope; and (c) an attachment member pivotally securing the second base to the first base, wherein the attachment member further includes:

(i) a intermediate support attached to the first base; and (ii) a least one pivot pin supported by the intermediate support, wherein a pivot end of the pivot pin is pivotally engaged in the second base so that the attachment member provides for pivotally adjusting the second base relative to the first base through a range of forward tilt angles to provide the microscope in an individually comfortable operating condition.

11. An ergonomically adjustable support device for supporting a microscope, the support device comprising:

(a) a first base positioned on a support surface and including at least two adjustment members, each for raising and lowering the vertical height of the first base relative to the support surface;

(b) a second base operatively contactable by the microscope;

(c) a fastening member provided on the second base for securing the microscope to an upper surface of the second base, wherein the fastening member comprises:

(i) a upwardly projecting extension of the second base; and (ii) a retaining clamp, wherein a first portion of the microscope contacts the extension and a second portion of the microscope is secured to the second base by the clamp; and (d) an attachment member pivotally securing the second base to the first base, wherein the attachment member provides or pivotally adjusting the second base through a range of forward tilt angles to provide the microscope in an individually comfortable operating condition.

* * * * *